(12) United States Patent
Givoly

(10) Patent No.: US 7,747,768 B1
(45) Date of Patent: *Jun. 29, 2010

(54) DIGITAL ASSET MONITORING SYSTEM AND METHOD

(75) Inventor: Tal Givoly, Cupertino, CA (US)

(73) Assignee: Amdocs (Israel) Ltd., Ra'anana (IL)

(*) Notice: Subject to any disclaimer, the term of this patent is extended or adjusted under 35 U.S.C. 154(b) by 0 days.

This patent is subject to a terminal disclaimer.

(21) Appl. No.: 12/353,762

(22) Filed: Jan. 14, 2009

Related U.S. Application Data

(63) Continuation of application No. 10/453,866, filed on Jun. 2, 2003, now Pat. No. 7,496,670, which is a continuation-in-part of application No. 09/935,129, filed on Aug. 21, 2001, now Pat. No. 6,947,984, which is a continuation of application No. 09/442,876, filed on Nov. 18, 1999, now Pat. No. 6,418,467.

(60) Provisional application No. 60/109,095, filed on Nov. 19, 1998, provisional application No. 60/066,898, filed on Nov. 20, 1997, provisional application No. 60/453,114, filed on Mar. 6, 2003.

(51) Int. Cl.
*G06F 15/16* (2006.01)

(52) U.S. Cl. .................. 709/230; 709/224; 705/51

(58) Field of Classification Search ......... 709/200–202, 709/224, 230, 231; 705/51
See application file for complete search history.

(56) References Cited

U.S. PATENT DOCUMENTS

| 7,171,021 | B2 * | 1/2007 | Yoshida et al. ............. 382/100 |
| 7,496,670 | B1 * | 2/2009 | Givoly ....................... 709/230 |
| 2002/0141584 | A1 * | 10/2002 | Razdan et al. ............. 380/203 |
| 2003/0037010 | A1 * | 2/2003 | Schmelzer .................. 705/67 |
| 2004/0054923 | A1 * | 3/2004 | Seago et al. ................ 713/201 |
| 2005/0185820 | A1 * | 8/2005 | Yoshida et al. ............. 382/100 |
| 2007/0294173 | A1 * | 12/2007 | Levy et al. ................... 705/51 |

OTHER PUBLICATIONS

Office Action Summary from U.S. Appl. No. 12/353,767 mailed on Feb. 9, 2010.

* cited by examiner

*Primary Examiner*—Moustafa M Meky
(74) *Attorney, Agent, or Firm*—Zilka-Kotab, PC

(57) ABSTRACT

A system, method and computer program product are provided for monitoring digital assets communicated over a network. Initially, packets communicated between a first party and a plurality of other parties are passively inspected. Such packets collectively include at least a portion of data associated with a digital asset. Thereafter, based on the inspected packets, at least one aspect associated with the first party and at least one aspect associated with the digital asset are identified.

17 Claims, 11 Drawing Sheets

DIGITAL ASSET MONITORING SYSTEM AND METHOD

RELATED APPLICATION(S)

The present application is a continuation of an application filed Jun. 2, 2003 under Ser. No. 10/453,866 now U.S. Pat. No. 7,496,670 which, in turn, is a continuation-in-part of an application filed Aug. 21, 2001 under Ser. No. 09/935,129 now U.S. Pat. No. 6,947,984 which, in turn, is a continuation of an application filed Nov. 18, 1999 under Ser. No. 09/442,876 now U.S. Pat. No. 6,418,467 which, in turn, claims priority from a first provisional application filed Nov. 19, 1998 under Ser. No. 60/109,095 and a second provisional application filed Nov. 20, 1997 under Ser. No. 60/066,898, which are each incorporated herein by reference in their entirety. The present application further claims priority from another provisional application filed Mar. 6, 2003 under Ser. No. 60/453,114, which is also incorporated herein by reference in its entirety.

FIELD OF THE INVENTION

The present invention relates to digital assets, and more particularly to monitoring the communication of digital assets via a network.

BACKGROUND OF THE INVENTION

In recent years, communication networks such as the Internet of which information devices such as computers are becoming common at explosive pace. In particular, the Internet covers most of the world. A very large number of servers are connected to the Internet. A very large number of users are always accessing the Internet. Nowadays, it is almost impossible to know not only all servers connected to the Internet, but all users who are accessing the Internet.

On the Internet, information is transmitted through computers (i.e. servers, user computers, etc.) that function as nodes. As a method for accessing the Internet, the user should directly connect his or her server to the Internet. Alternatively, the user should contract with a so-called provider for an Internet connection service and then connect user's terminal unit to a server of the provider using a dial-up connecting method, leased line, data over cable, DSL, and/or other connection mechanisms (i.e. WiFi, etc.).

In addition, on the Internet, the user can upload data to a server for which he or she has contracted so as to publish information. As a means for publishing information to the Internet, web pages are known. Using web pages, Internet addresses from which data is published (these addresses are referred to as URL: Uniform Resource Locator) can be easily accessed. In addition, using for example FTP (File Transfer Protocol), directories that store data can be directly accessed. Still yet, data may be shared among users using "peer-to-peer" protocols.

In view of the vast number of servers and users on the Internet, illegal actions cannot be easily prevented. For example, using the various methods discussed above, it is quite common that unauthorized persons communicate copyrighted works and other digital assets that belong to another person without permission. There is thus a need to improve the manner in which copyrighted content and other digital assets are protected on various networks.

DISCLOSURE OF THE INVENTION

A system, method and computer program product are provided for monitoring digital assets communicated over a network. Initially, packets communicated between a first party and a plurality of other parties are passively inspected. Such packets collectively include at least a portion of data associated with a digital asset. Thereafter, based on the inspected packets, at least one aspect associated with the first party and at least one aspect associated with the digital asset are identified.

In one embodiment, the at least one aspect associated with the first party may identify an identity of the first party. As an option, the at least one aspect associated with the first party may include an Internet Protocol (IP) address. Moreover, the at least one aspect associated with the first party may include a time when the packets were communicated. Of course, any type of identifying factor may be employed.

In another embodiment, at least one aspect associated with at least one of the plurality of other parties may be identified, based on the inspected packets. As mentioned hereinabove, any type of identifying factor may be employed in the context of the present embodiment.

In still yet another embodiment, the at least one aspect associated with the digital asset may identify the digital asset. For example, the at least one aspect associated with the digital asset may include a file name. Of course, any type of identifying factor may be employed.

Optionally, the packets may be communicated via a peer-to-peer protocol, a client-server protocol, or the like. Moreover, it may be determined whether the digital asset is compressed. If so, the digital asset may be decompressed prior to identifying the at least one aspect associated with the first party and the at least one aspect associated with the digital asset.

In a similar manner, it may be determined whether the digital asset is encrypted, and the digital asset may be decrypted prior to identifying the at least one aspect associated with the first party and the at least one aspect associated with the digital asset.

In still yet another embodiment, the packets communicated between the first party and the plurality of other parties may be inspected at two or more separate nodes on the network in a distributed framework. In such embodiment, the at least one aspect associated with the first party and the at least one aspect associated with the digital asset may be identified based on the inspection of the packets at the two or more separate nodes on the network.

The at least one aspect associated with the first party and the at least one aspect associated with the digital asset may be identified for a variety of purposes. Just by way of example, such aspects may be identified for detecting a copyright infringement associated with the communication of the digital asset, generating revenue for the communication of the digital asset, market analysis, fraud analysis, service level management, etc.

Another system, method and computer program product are provided for monitoring digital assets communicated over a network. In the present embodiment, a record associated with the communication of a digital asset over a network is collected. Such record may then be enhanced to facilitate the monitoring of the digital asset.

In one embodiment, the enhancing may include identifying at least one aspect associated with a party to the communication. Moreover, the enhancing may include identifying at least one aspect associated with the digital asset. Of course, any type of identifying factor may be employed. Moreover, such information may be collected for any purpose including, but not limited to those listed above.

In an embodiment where measures have been taken to increase the anonymity associated with the communication, the enhancing may be equipped to remove anonymity associated with the party to the communication and/or the digital asset.

Still another system, method and computer program product are provided for monitoring a digital asset communicated over a network in an encoded format. Initially, at least a portion of data associated with a digital asset is captured. Next, the portion of data associated with the digital asset is decoded. Then, the decoded portion of data associated with the digital asset is compared with a library of digital assets.

In one embodiment, the portion of data associated with the digital asset may be filtered to reduce the amount of processing involved with the comparing operation. In a similar manner, the portion of data associated with the digital asset may be compared with a subset of the library of digital assets to reduce the amount of processing involved with the comparing operation.

Thus, statistically sampling of the sessions may be performed, capturing a select portion of sessions, but potentially the entire session. In addition to creating a log of the events, it is possible to perform further analysis on the data. Such analysis may be envisioned to include sampled decoding of either lossy or loss-less compression-based encoding of digital assets (such as video, audio and still images). These samples may then be compared against samples of a database of copyrighted material. If the samples significantly resemble the copyrighted material (based on user-configurable thresholds to avoid false alarms), events may be generated as well as evidence gathered, in order to pursue action.

It should be noted that the above analysis may be compute resource intensive (e.g. CPU). Therefore, it may, in one embodiment, not recommended or practically feasible to perform such analysis on every single P2P instance in a communication network. As with many functions of law enforcement, it may be recommended to use some statistical sampling method and apply such comparison functions on only a portion of the network traffic.

A good analogy to P2P traffic of copyrighted material may be served by comparing it with traffic violations by drivers on a freeway. Law enforcement is not performed by placing a police officer in each vehicle to verify that the driver isn't violating any laws—instead, patrol cars are sporadically deployed and check a small sample of the cars for a sample of traffic violations (such as speeding). The rationale behind this approach is obviously related to cost/benefit feasibility of the solution. The random sampling represents a significant deterrent to illegal behavior.

Getting back to the issue of illegal transmission of digital assets, the deterrent may be much more effective, even if it is based on sampled data. For instance, by using the complete log of events, it is possible to easily and dynamically identify the heavy users of P2P networks to and check a sample of their network traffic compared to a sample of digital assets in a copyright holder's database.

In another embodiment, the decoded portion of data associated with the digital asset may be compared with the library of digital assets utilizing a phase to facilitate the comparing operation. In such embodiment, a resolution, a frequency, and/or a frame rate of the decoded portion of data associated with the digital asset may be synchronized with that of the library of digital assets to facilitate the comparing operation.

Thereafter, an amplitude of the decoded portion of data associated with the digital asset may be normalized. Still yet, the normalized decoded portion of data associated with the digital asset and the library of digital assets may be subtracted to generate a difference during the comparing operation. Such difference may optionally be subjected to a root mean square (RMS) operation.

Next, the foregoing difference may be compared to a number that is substantially zero. It may then be determined whether the portion of data associated with the digital asset matches at least one of the digital assets of the library based on the comparison with zero. Of course, any aggregation function may be used to create a metric to identify the identity of inexact matches.

DESCRIPTION OF THE PREFERRED EMBODIMENTS

Figure 1:
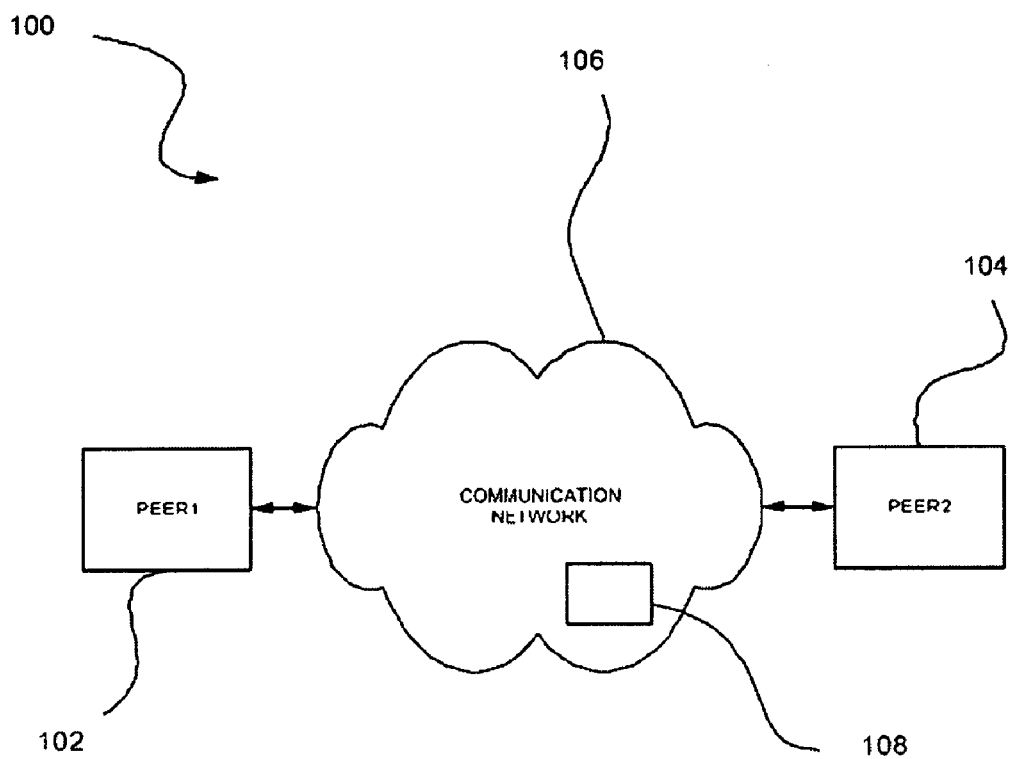
FIG. 1 illustrates an exemplary network architecture, in accordance with one embodiment.

FIG. 1 illustrates an exemplary network architecture 100, in accordance with one embodiment. As shown, a pair of peer computers 102, 104 are provided. In the context of the present description, such peer computers 102, 104 may include any type of computing device (i.e. cellular phone, personal digital assistant (PDA), home entertainment system, personal computer, workstation, etc.). Of course, the various embodiments set forth herein may be implemented utilizing hardware, software, or any desired combination thereof. For that matter, any type of logic may be utilized which is capable of implementing the various functionality set forth herein.

Moreover, such peer computers 102, 104 communicate via a communication network 106. In the context of the present network architecture 100, the communication network 106 may take any form including, but not limited to a local area network (LAN), a wide area network (WAN) such as the Internet (based on IPv4 or IPv6), wireless network, etc.

Further included as a component of the network architecture 100 is a module 108 for monitoring digital assets communicated over the communication network 106 between the peer computers 102, 104. In the context of the present embodiment, the digital assets may include any digital code segment capable of being transmitted over the communication network 106.

The digital assets may be monitored for any one of a variety of purposes. Just by way of example, they may be monitored for detecting a copyright infringement associated with the communication of the digital asset, generating revenue for the communication of the digital asset, market analysis, fraud analysis, service level management, etc. More information regarding an exemplary operation of the module 108 will now be set forth.

Figure 2:
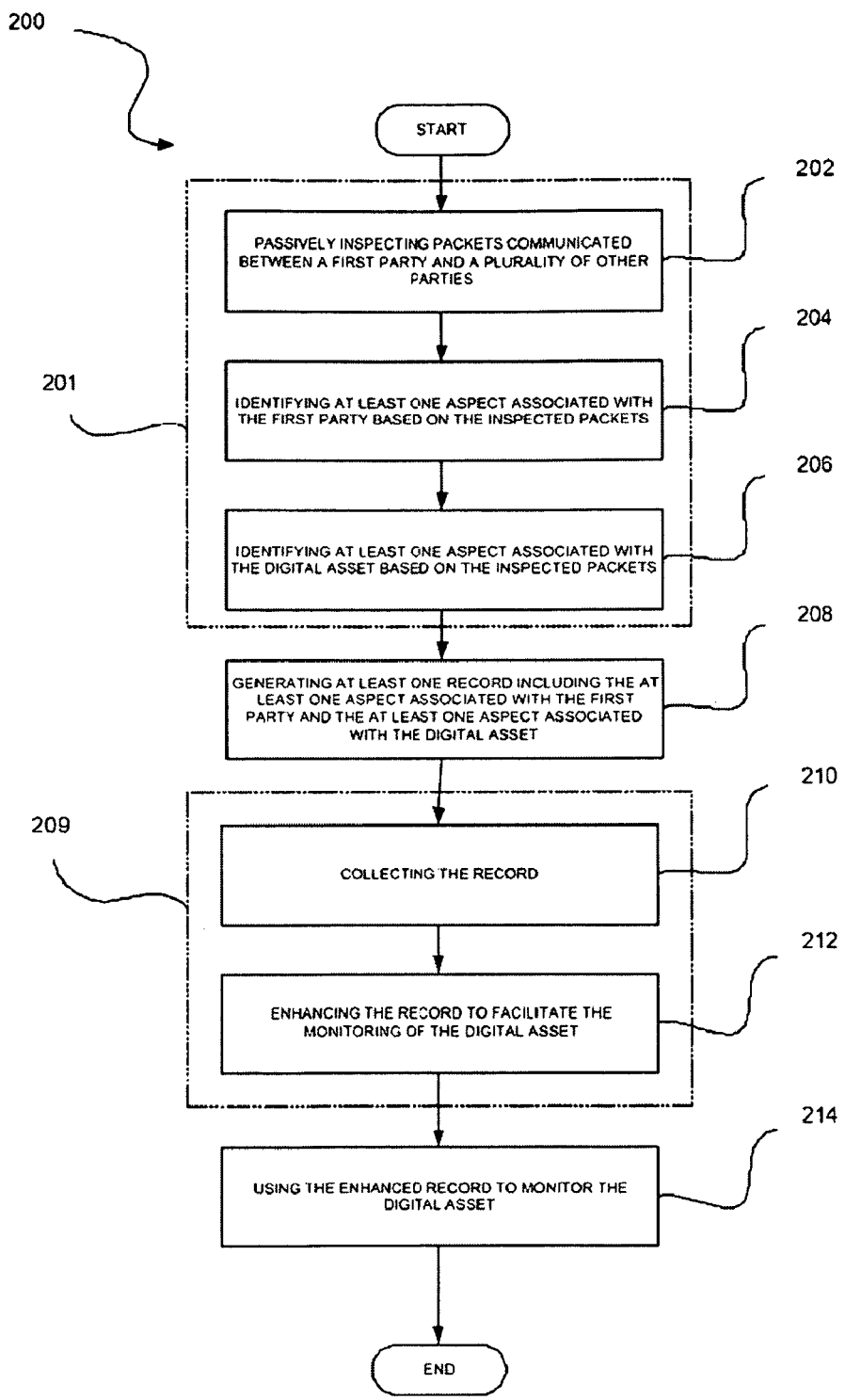
FIG. 2 illustrates a method for monitoring digital assets communicated over a network, in accordance with one embodiment.

FIG. 2 illustrates a method 200 for monitoring digital assets communicated over a network, in accordance with one embodiment. As an option, such method 200 may be implemented in the context of the module 108 of the exemplary network architecture 100 of FIG. 1. Of course, however, the present method 200 may be implemented in any desired context. Just by way of example, the method 200 may be carried out in a server-client architecture, as will soon be set forth.

As shown, the present method 200 may optionally be divided into two separate sub-methods 201 and 209. Such sub-methods 201 and 209 may be performed by separate entities (i.e. person, computer, company, etc.), or possibly by the same entity. For that matter, any operation of either of the sub-methods 201 and 209 may be divided and/or combined among entities as desired.

Initially, in operation 202, packets communicated between a first party and a plurality of other parties are passively inspected. In the context of the present description, such packets may include any component of network communication over a network such as that shown in FIG. 1. Just by way of example, the packets may each include a header and payload section. Moreover, it is conceivable that the packets may include any components of a streaming, frame-based, cell-based network architecture, etc.

It should be noted that the aforementioned packet inspection should be passive "at least in part." In other words, it is conceivable that other active operations may be carried out in combination with the passive inspection. For example, the associated module may inject/drop/modify/shape/change/route packets it handles in addition to the passive inspection. Such functions may be guided also by the inspection of packets.

As an option, the first party and other parties may include a user and/or an associated computer. Again, the computer may include any hardware, software, or any desired combination thereof; as set forth hereinabove.

It should be noted that the foregoing packets collectively include at least a portion of data associated with a digital asset. Again, the digital asset may include any digital code segment capable of being transmitted over the network. Just by way of example, the digital asset may include digital video, digital audio, digital writings, etc. As an option, such digital asset may be proprietary in nature by way of a copyright or some other legal instrument (i.e. contract, patent, etc.).

It should be further noted that the aforementioned "data" associated with the digital asset may include at least a portion of the digital asset itself and/or data associated with the communication thereof via the network. For example, the packets may include meta-data describing the exchange of digital assets over the network.

Optionally, the packets may be communicated via a peer-to-peer protocol, a client-server protocol, or the like. Table 1 below illustrates some exemplary peer-to-peer protocols, while Table 2 illustrates some exemplary client-server protocols. It should be noted that such lists of protocols are set forth for illustrative purposes, and should not be construed as limiting in any manner.

TABLE 1

KaZaA
Morpheous
Gnutella
Napster
eDonkey
JXTA

TABLE 2

FTP
HTTP
SMTP
POP3
IMAP3
IMAP4

In the case where the data associated with the digital asset includes the digital asset itself, it may optionally be determined whether the digital asset is compressed via an encoding process. If so, the digital asset may be decompressed prior to continuing with subsequent operations of method 200 of FIG. 2. It should be noted that such encoding may also be extended to an encryption process. In a similar manner, it may be determined whether the digital asset is encrypted, and the digital asset may be decrypted prior to continuing. In general, any particular layers, embedded data, etc. associated with the digital asset may be "peeled" to expose the digital asset before identifying various aspects associated therewith in a manner that will now be set forth.

As an option, the actual digital asset [from access to a library (i.e. a database, etc.) of digital assets such as songs, pictures, etc.] may be compared to the transmitted encoding of the digital asset. Any detected difference resulting from this comparison may then, in turn, be compared (i.e. to a number that is substantially zero) to identify a match based on the digital asset itself. For example, MP3 audio may be decoded into individual audio samples, and a correlation may be found between amplitude peaks and a signature of digital assets in a library. The right phase in which to compare the two samples may also be identified. Thereafter, the digital signal of the original audio digital sample may be subtracted. The result of this may then be compared to "zero" (if it is remotely close to zero). More information regarding such embodiment will be set forth in greater detail during reference to FIGS. 2A and 2B.

It should be noted that AGC may need to be applied to the encoded signal, or another more sophisticated method of normalizing to avoid attempts to overcome the comparison. For example, the signal may be attenuated or amplified to match the peak signals and zero offset of the digital asset.

Thereafter, in operation 204, based on the inspected packets, at least one aspect associated with the first party is identified. After the packets are inspected, analysis associated operation 204 and subsequent operations may be performed in real-time, or be performed off-line using stored results of the packet inspection (including, optionally, stored raw packets of the compared segment).

As an option, the at least one aspect associated with the first party may identify an identity of the first party. For example, the at least one aspect associated with the first party may include an Internet Protocol (IP) address. Moreover, the at least one aspect associated with the first party may include a time when the packets were communicated.

Table 3 illustrates various exemplary aspects that may be identified. Of course, any type of identifying aspect may be employed which enables the identification of the first party, at least in part. Again, it should be noted that such list of aspects is set forth for illustrative purposes, and should not be construed as limiting in any manner.

TABLE 3

Address (i.e. IP, telephone, MAC, etc.)
User name
User name within peer group
Mobile communication network identifiers
(i.e. IMSI, MIN, MSISDN, NAI, ESN, etc.)

In another embodiment, at least one aspect associated with at least one of the plurality of other parties may be identified, based on the inspected packets. As mentioned hereinabove, any type of identifying factor may be employed in the context of the present embodiment.

In operation 206, at least one aspect associated with the digital asset may be identified. In one embodiment, the at least one aspect associated with the digital asset may identify the digital asset. For example, the at least one aspect associated with the digital asset may include a file name. Of course, any type of identifying factor may be employed.

Table 4 illustrates various exemplary aspects that may be identified. Of course, any type of identifying aspect may be employed which enables the identification of the digital asset, at least in part. Again, it should be noted that such list of aspects is set forth for illustrative purposes, and should not be construed as limiting in any manner.

TABLE 4

For audio:

Song title
Artist
Album
Index within album
Sampling rate
Encoding format
File name
Any other information available in MP3 ID3 tags/WMA, etc.

For video (usually coupled with audio):

Program title
Artist
Encoding format
Sampling rate
File name

For software:

File name
Software vendor name
Software title
Version of software

In a distributed framework, the packets communicated between the first party and the plurality of other parties may be inspected at two or more separate nodes on the network. In such embodiment, the at least one aspect associated with the first party and the at least one aspect associated with the digital asset may be identified based on the inspection of the packets at the two or more separate nodes on the network. More information regarding some exemplary techniques with which such distributed framework may be implemented will be set forth during reference to FIGS. 5-8B.

As an option, a record associated with the communication of the digital asset over the network may be generated in operation 208. In one embodiment, such record may involve an aggregation of the foregoing aspects (as well as any other aspects).

With such record generated [and possibly temporarily stored in memory (i.e. RAM, persistent storage, etc.) with a plurality of similar records], such a record associated with the communication of the digital asset over the network may be collected by the same or different entity. See operation 210.

The record may then be enhanced in operation 212 to facilitate the monitoring of the digital asset. In one embodiment, the enhancing may include identifying at least one additional aspect associated with a party to the communication. Moreover, the enhancing may include identifying at least one additional aspect associated with the digital asset.

For example, the enhancing may include additional work (i.e. processing, etc.) that may help identify the additional aspect. It should be noted that such additional aspects may include any aspect or portion thereof not present when the record was collected.

In situations where there has been efforts made by the parties communicating the digital asset to make either themselves and/or the digital asset anonymous, the enhancing may correct any deficiencies in the descriptive aspects collected in operations 204 and 206. For example, the parties may utilize a central or distributed index data structure which maps anonymous identifiers with actual descriptions. In such situation, the present enhancement may use similar means to access the index and enhance the previous aspects to facilitate the monitoring process.

In another example where the digital asset and/or related descriptive data is communicated in "pieces" using various nodes on a network, the present enhancement operation 212 may be used to reconstruct the same. Again, more information regarding some exemplary techniques with which such distributed framework may be implemented will be set forth during reference to FIGS. 5-8B.

In still another example, various previously stored information related to various aspects of the first party/digital asset associated with a particular session or the like may be stored, and used later to enable or facilitate the foregoing enhancement process.

Still yet, more information relating to one specific exemplary technique for aggregating the various aspects in a record in accordance with operation 208, and further collecting/enhancing the records in accordance with operations 210-212 will be set forth hereinafter during reference to FIGS. 5-8B.

The at least one aspect associated with the first party and the at least one aspect associated with the digital asset may be identified for a variety of uses, as set forth in operation 214. It should be noted that such uses may be available both after the execution of the separate sub-methods 201 and/or 209.

Just by way of example, the foregoing aspects may be identified for detecting a copyright infringement associated with the communication of the digital asset, generating revenue for the communication of the digital asset, market analysis, fraud analysis, service level management including quality-of-service (QoS) analysis of transmission and overall service offerings, etc.

In particular, the foregoing aspects may be used for identifying, and enabling prosecution of illegal transmission of copyrighted material. Still yet, they may be used for identifying legal copyright transfer and comparing against logs of legal transmissions for revenue assurance purposes. With respect to market analysis, various parameters associated with the distribution and usage of digital media, including, but not limited, to demographics of users and their interests, etc. may be analyzed. As an option, accounting, billing, charge-back, and/or interconnect settlement may be facilitated between various parties. Such parties may include, but are not limited to carriers involved in transactions, owners of digital rights, consumers/subscribers/users, peering networks, providers of digital media, etc.

Figure 2A:
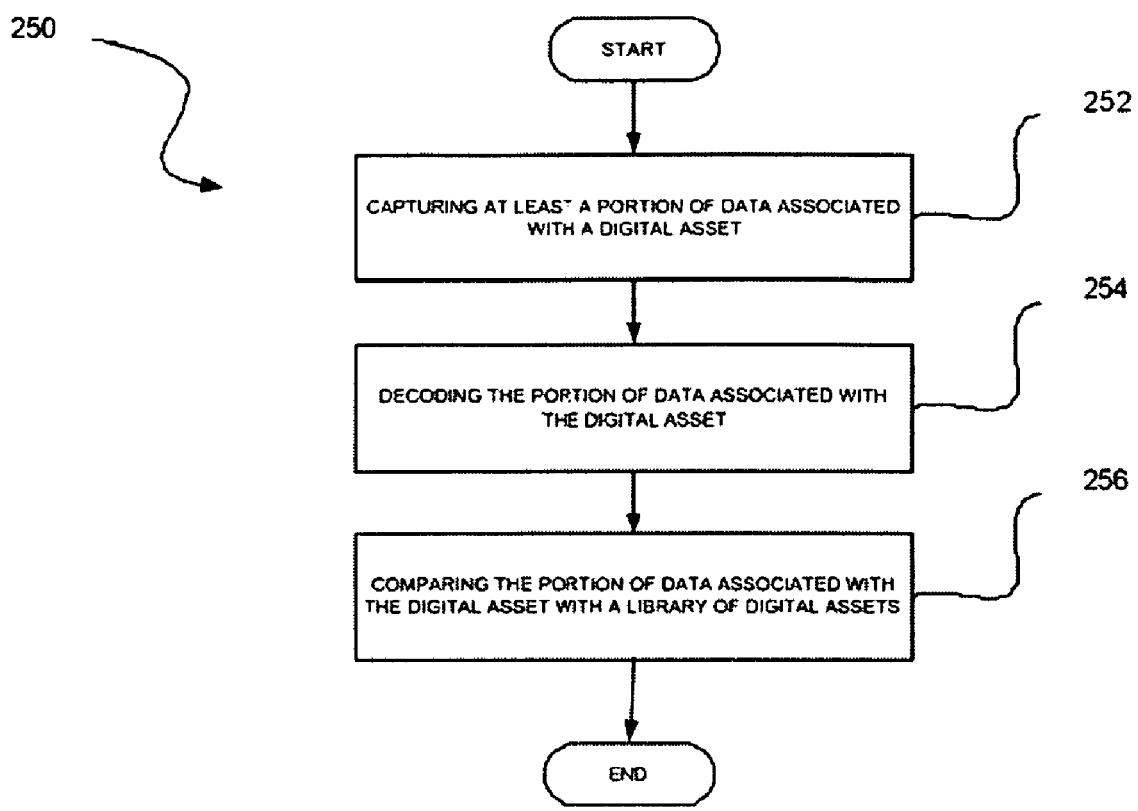
FIG. 2A illustrates a method for monitoring a digital asset communicated over a network with an encoded format, in accordance with one embodiment.

FIG. 2A illustrates a method 250 for monitoring a digital asset communicated over a network with an encoded format, in accordance with one embodiment. In one embodiment, the present method 250 may be implemented in the context of the method 200 of FIG. 2, as described earlier. It should be noted, however, that the present method may be implemented in any desired context.

Initially, in operation 252, at least a portion of data associated with a digital asset is captured. The present embodiment is adapted specifically for monitoring a digital asset communicated over a network with an encoded format. Such encoding may refer to any type of compression, encryption, etc. When or after such encoded portion of data is captured, it is decoded. See operation 254. Such decoding may refer to any process or technique of reversing the encoding process or rendering the original data or a portion thereof that existed prior to the encoding.

As described earlier, such portion of the digital asset data is then ready to be compared against a library of digital assets (know to be legally protected via a patent, copyright, contract, etc.) in order to determine whether there is a match such that the match may be stored and delivered for evidentiary purposes so that a legal right may optionally be enforced.

Since the amount of data being captured and the amount of digital assets in the library may be quite voluminous, the processing required for such comparison may be cumbersome. Thus, in one embodiment, the captured portion of data associated with the digital asset may be filtered to reduce the amount of processing involved with the comparing.

For example, data of only a certain type (i.e. audio, video, software, etc.) may be captured and/or used in the comparison. Still yet, data time-sampled at a certain time of day or from certain sources may be captured and/or used in the comparison. As an option, the data may be filtered in a random manner (i.e. "x" amount of data/minute). Even still, the filter may be statically or dynamically configured. For instance, the filter may be governed based on available resources. Optionally, only a predetermined-sized portion may be captured and/or used in the comparison.

For example, criteria such as a percentage of the overall number of files transferred may be used in the foregoing comparison. Also, one may track repeat users and target them individually by manually configuring filters to track their content or by automating the process of logging transactions, identifying heavy users by means of aggregation, and updating dynamic filters.

In a similar manner, the portion of data associated with the digital asset may be compared with only a subset of the library of digital assets to reduce the amount of processing involved with the comparing operation. Similar to that described earlier, the subset of the library used during the comparison may be limited based on the type thereof. Moreover, the subset may be statically or dynamically configured based on various factors. Still yet, the subset may involve only digital assets associated with certain parties or associations (i.e. certain specific copyright holders, etc.).

Also, it is possible that a small portion of the traffic be set aside for manual or automated off-line comparison rather than all performed with the same, finite, resources available at the passive inspection points where packets are captured and analyzed. There is no time sensitivity given that all the identifying information of the digital asset as well as the communicating parties have already been enhanced and added to the meta-data describing the event that occurred. All that is now required is to verify that there is indeed an infringement. A human could, for instance, play back the decompressed/decoded segment and listen to it to determine whether it matches a copyrighted material and use this as subjective evidence.

In any case, the amount of data involved during the comparison is reduced to accommodate any shortcomings in processing resources, while maximizing the results of the present method. With the desired data filtered, the decoded portion of data associated with the digital asset is compared with a library of digital assets. Note operation 256. At that point, any match may be logged and possibly reported to a third party for evidentiary purposes and possible enforcement of any rights associated with the digital asset. While the comparison of operation 256 may take any form, one particular example will now be set forth.

Figure 2B:
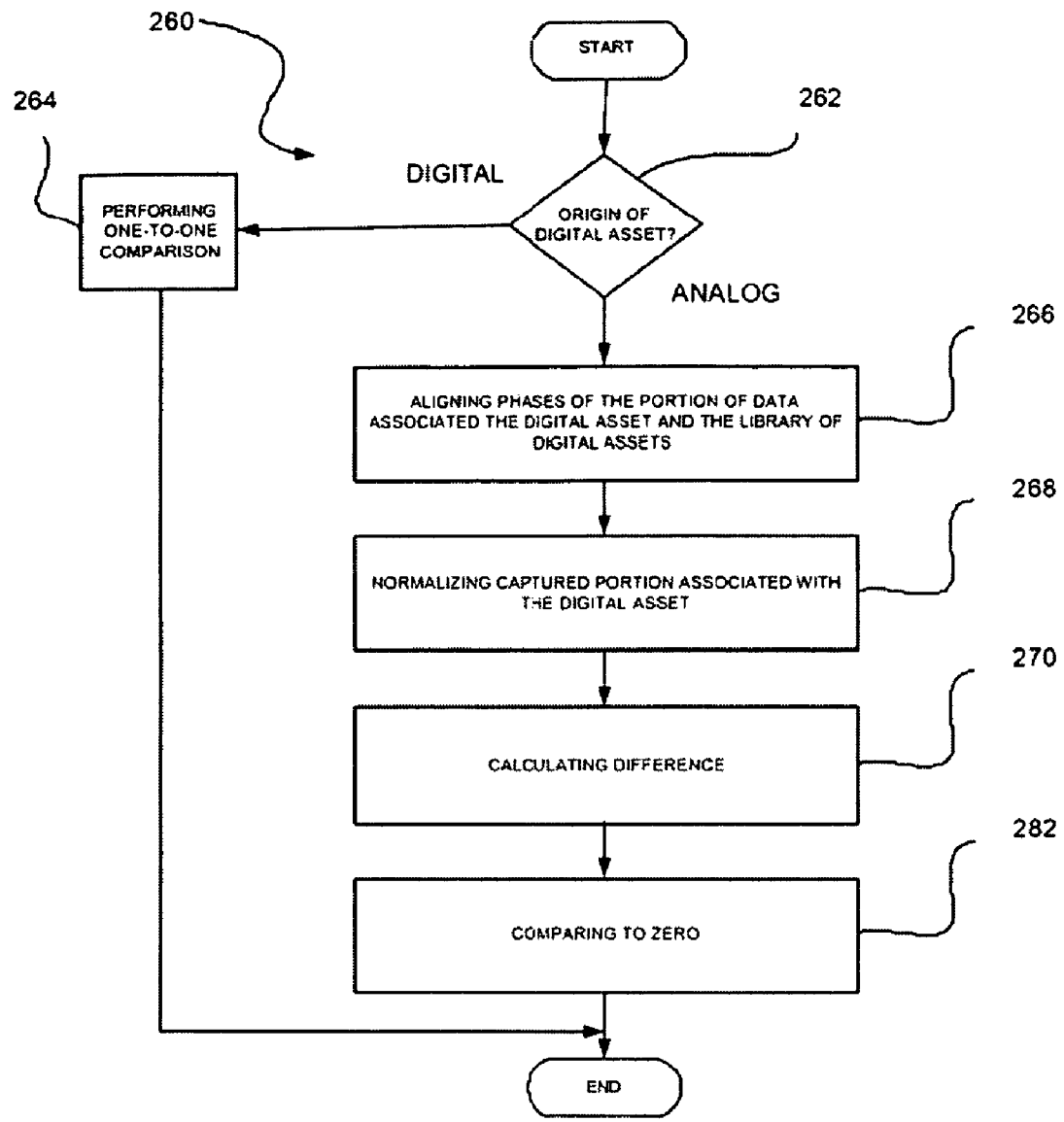
FIG. 2B illustrates a method for comparing the captured portion of data associated with the digital asset with the digital assets of the library, in accordance with the method of FIG. 2A.

FIG. 2B illustrates a method 260 for comparing the captured portion of data associated with the digital asset with the digital assets of the library. In one embodiment, the present method 260 may be implemented in the context of operation 256 of the method 200 of FIG. 2, as described earlier. It should be noted, however, that the present method may be implemented in any desired context.

During one exemplary comparison procedure, it is initially determined whether an origin of the digital asset was digital or analog. See decision 262. In the case where the digital asset originates in a digital form (i.e. software, etc.), a one-to-one comparison may be employed between the captured portion of the digital asset and the library of digital assets. See operation 264.

For example, a first portion (i.e. starting from a start time, byte, etc. to a predetermined offset, etc.) may be compared against corresponding first portions of the digital assets in the library. However, if the start time, byte, etc. of the captured portion of data is not known, the captured portion may be compared against an entirety of each of the digital assets of the library.

In the case where the digital asset originated in analog form (i.e. still images, audio, video, etc.), a phase of the captured portion may be aligned with that of the library digital assets. Note operation 266. Of course, this procedure may be carried out when the captured portion is compared against each of the digital assets of the library. In one embodiment, the phase of the captured portion may be identified by multiplying decoded values.

It may possibly be ideal to identify the phase in order to compare segments, if not the entire segment of the digital asset is compared or if the digital asset being compared doesn't start precisely at the same time or offset. One method (not the only method) to identify the correct phase to compare the signal captured against the digital asset is to find an offset (n) that maximizes the value of sum over n of (Ti*Di+n).

For example, the following formula may be used:

$$\sum_{i=0}^{m} T_i \cdot D_{1+n},$$

where Ti is the value of sample i of transferred, intercepted and decoded digital asset, and Di is the numeric value of sample i of the digital asset from the library to which the intercepted digital asset is being compared against. m is the larger of the two numbers of samples in the two digital assets being compared. The value n that maximizes the value of this sum is sought in an operation referred to as correlation. This is one of several ways to identify the best offset to perform an automated comparison of the difference/identity between the two digital assets.

To further enhance such phase alignment, various parameters of the captured portion may be synchronized with the digital assets of the library. For example, a resolution (in the case of images), a frequency (in the case of audio), and/or a frame rate (in the case of video) of the decoded portion of data associated with the digital asset may be synchronized with that of the library of digital assets to facilitate the comparing operation. So that minimal processing resources are required, one may choose to synchronize a higher parameter (i.e. frequency in the case of audio, etc.) with a lower parameter.

With the phases aligned, a peak amplitude ($P_A$) of the digital assets (A) of the library and a peak amplitude ($P_B$) of the decoded portion (B) of data associated with the digital asset are calculated. With these values, the decoded portion of data associated with the digital asset may be normalized. Note operation 268 and Equation #1. It should be noted that any desired normalization may be employed.

$$(P_A/P_B)*B \qquad \text{Equation \#1}$$

Next, the normalized decoded portion of data associated with the digital asset and the library of digital assets may be subtracted to generate a difference during the comparing operation. See operation 270. Optionally, such difference may also be subjected to a root mean square (RMS) operation. At this point, such difference may be compared to zero. See operation 282 and Equation #2.

$$RMS[(A-(P_A/P_B)*B)]=0 \qquad \text{Equation \#2}$$

It may then be determined whether the portion of data associated with the digital asset matches at least one of the digital assets of the library based on the comparison with zero. For example, if the difference substantially equals zero within a predetermined threshold, it may be determined that a match is made. At that point, the match may be logged and possibly delivered to a third party for evidentiary purposes and possible enforcement of any rights associated with the digital asset.

Figure 3:
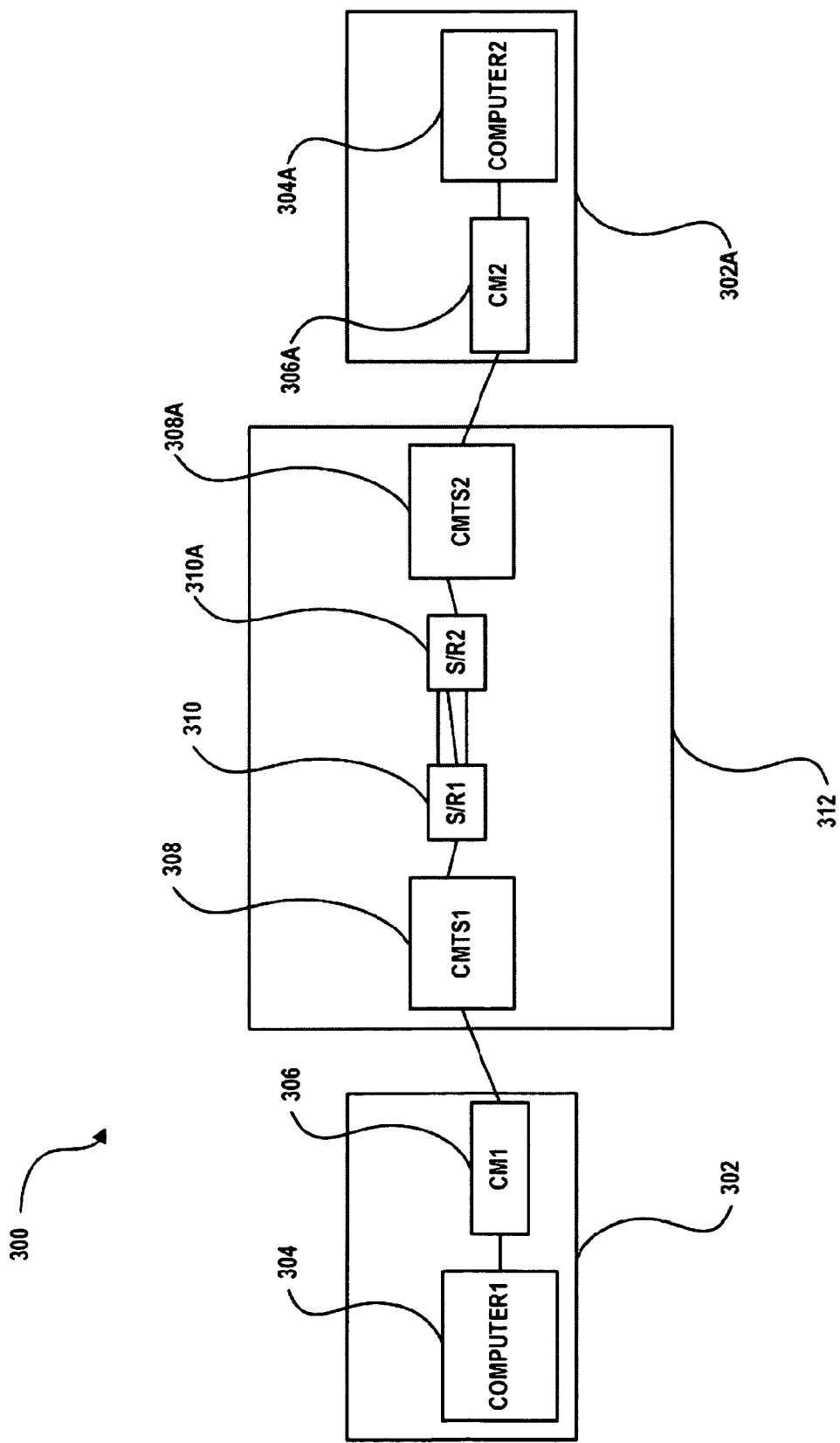
FIG. 3 illustrates a specific network architecture, in accordance with one optional embodiment.

FIG. 3 illustrates a specific network architecture 300, in accordance with one optional embodiment. As an option, the method 200 of FIG. 2 may be implemented in the context of the network architecture 300 of FIG. 3. Of course, the method 200 of FIG. 2 may be carried out in any desired context.

As shown, a pair of peers 302, 302A is provided. Such peers 302, 302A may be further equipped with computers 304, 304A including cable modems 306, 306A.

Moreover, such peer computers 304, 304A may communicate via a communication network 312. In the context of the present network architecture 300, the communication network 312 may include at least one cable modem termination system 308, 308A. As an option, a plurality of switches/routers 310, 310A may be coupled between the cable modem termination systems 308, 308A for facilitating communication therebetween.

As an option, the aforementioned module of FIG. 1 may be embodied in at least one of the cable modem termination systems 308, 308A for monitoring the communication of digital assets in a manner, for example, like method 200 of FIG. 2. While the present embodiment includes the digital asset-monitoring module incorporated in the cable modem termination systems 308, 308A, it should be noted that the module may be incorporated, attached, etc. to any of the components shown in FIG. 3. For example, the module may: be part of a network/service element that observes or processes the packets, be connected via a tap (optical or electrical), be connected via an interface coupled to a spanning port or mirror port of a switch.

Figure 4:
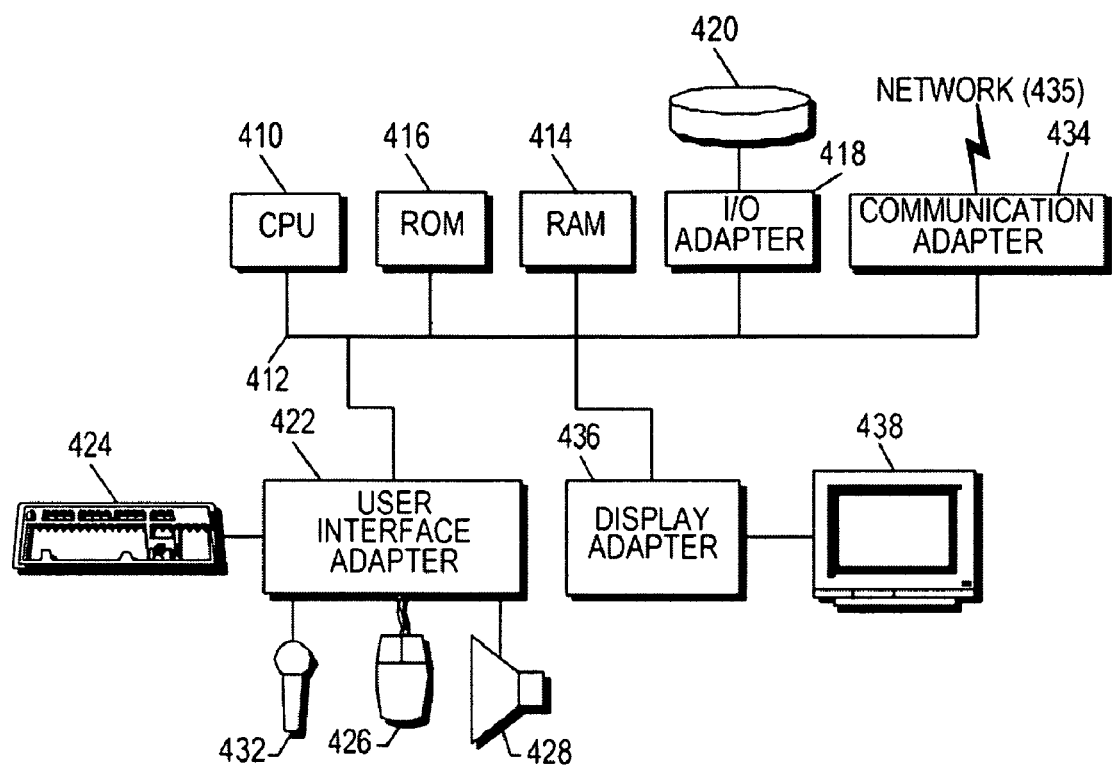
FIG. 4 shows a representative hardware environment associated with the various computers shown in the network architecture of FIG. 3.

FIG. 4 shows a representative hardware environment associated with the various computers shown in the network diagram of FIG. 3. Such figure illustrates a typical hardware configuration of a workstation in accordance with one embodiment having one or multiple central processing units 410, such as a microprocessor, and a number of other units interconnected via a system bus 412.

The workstation shown in FIG. 4 includes a Random Access Memory (RAM) 414, Read Only Memory (ROM) 416, an I/O adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen (not shown) to the bus 412, communication adapter 434 for connecting the workstation to a communication network 435 (e.g., a data processing network) and a display adapter 436 for connecting the bus 412 to a display device 438.

Again, it should be noted that the present description is set forth for illustrative purposes only and should not be construed as limiting in any manner. For example, the computers may include any type of computing device (i.e. cellular phone, personal digital assistant (PDA), home entertainment system, etc.).

For further information on another exemplary architecture embodiment, reference may be made to PCT application WO9927556A2 entitled "NETWORK ACCOUNTING AND BILLING SYSTEM AND METHOD" published Jun. 3, 1999, which is incorporated herein by reference in its entirety. More information on such exemplary system will be set forth hereinafter starting with reference to FIG. 5. Still yet, information on a technology that may be used to facilitate any session reconstruction involved in the method 200 of FIG. 2 may be found with reference to PCT application WO0101726A3 entitled "METHOD AND APPARATUS FOR SESSION RECONSTRUCTION" published Jan. 4, 2001, which is incorporated herein by reference in its entirety.

It should be noted that the foregoing architectures should not be construed as limiting in any manner, and should be taken to merely represent exemplary systems for illustrative purposes only. For example, the present embodiment may be implemented in the context of any chip, host, router, network device, architecture, etc. that is desired.

Alternate Exemplary Embodiment

Various embodiments of systems in which the foregoing details may be implemented will now be set forth immediately hereinafter and in Appendix A. Of course, the following descriptions should not be construed as limiting in any manner, and should be taken to represent merely exemplary systems for illustrative purposes.

The present embodiment includes a multi-source, multi-layer network usage metering and mediation solution that gives Network Service Providers (NSPs), including Internet Service Providers (ISPs) and enterprise network (Intranet) operators, the information needed to set the right-price for IP (Internet Protocol) services. With the system, the providers can generate accurate usage-based billing and implement usage-based charge-back models. The system derives IP session and transaction information, collected in real time, from a multitude of network elements. The system gathers, correlates, and transforms data from routers, switches, firewalls, authentication servers, LDAP, Web hosts, DNS, and other devices to create comprehensive usage and billing records.

The system transforms raw transaction data from network devices into useful billing records though policy-based filtering, aggregation, and merging. The result is a set of detail records (DRs). In some embodiments, the detail records are eXtensible Detail Records (XDRs) available from XaCCT Technologies. DRs are somewhat similar in concept to the telephony industry's Call Detail Records (CDRs). Thus, DRs can be easily integrated with existing Customer Care and Billing (CCB) systems.

In addition to billing data, DRs enable NSPs to deploy new services based on documented usage trends, plan network resource provisioning, and audit service usage. The system provides a clear picture of user-level network service use by tracking a variety of metrics such as actual session Quality of Service (QoS), traffic routes, and end-user application transactions.

The system is based on a modular, distributed, highly scalable architecture capable of running on multiple platforms. Data collection and management is designed for efficiency to minimize impact on the network and system resources.

The system minimizes network impact by collecting and processing data close to its source. Modular architecture provides maximum configuration flexibility, and compatibility with multiple network information sources.

The system, or other embodiments, may have one or more of the following features.

Data collection can be from a wide range of network devices and services, spanning alt layers of the network— from the physical layer to the application layer.

Real-time, policy-based Filtering, aggregation, enhancement and merging create accurate, detailed and comprehensive session detail records (DRs).

Real time correlation of data from various sources allows billing record enhancement.

Leverages existing investment through integration with any customer care & billing solution, reducing costs, minimizing risks and shortened time-to-market.

Non-intrusive operation eliminates any disruption of network elements or services.

Web-based user interface allows off-the-shelf browsers to access the system, on-demand, locally or remotely.

Carrier-class scalability allows expansion to fit an NSPs needs without costly reconfiguration.

Distributed filtering and aggregation eliminates system capacity bottlenecks.

Efficient, centralized system administration allows on-the-fly system reconfigurations and field upgrades.

Customized reporting with built-in report generation or an NSPs choice of off-the-shelf graphical reporting packages.

Comprehensive network security features allow secure communication between system components and multiple levels of restricted access.

System Details

Figure 5:
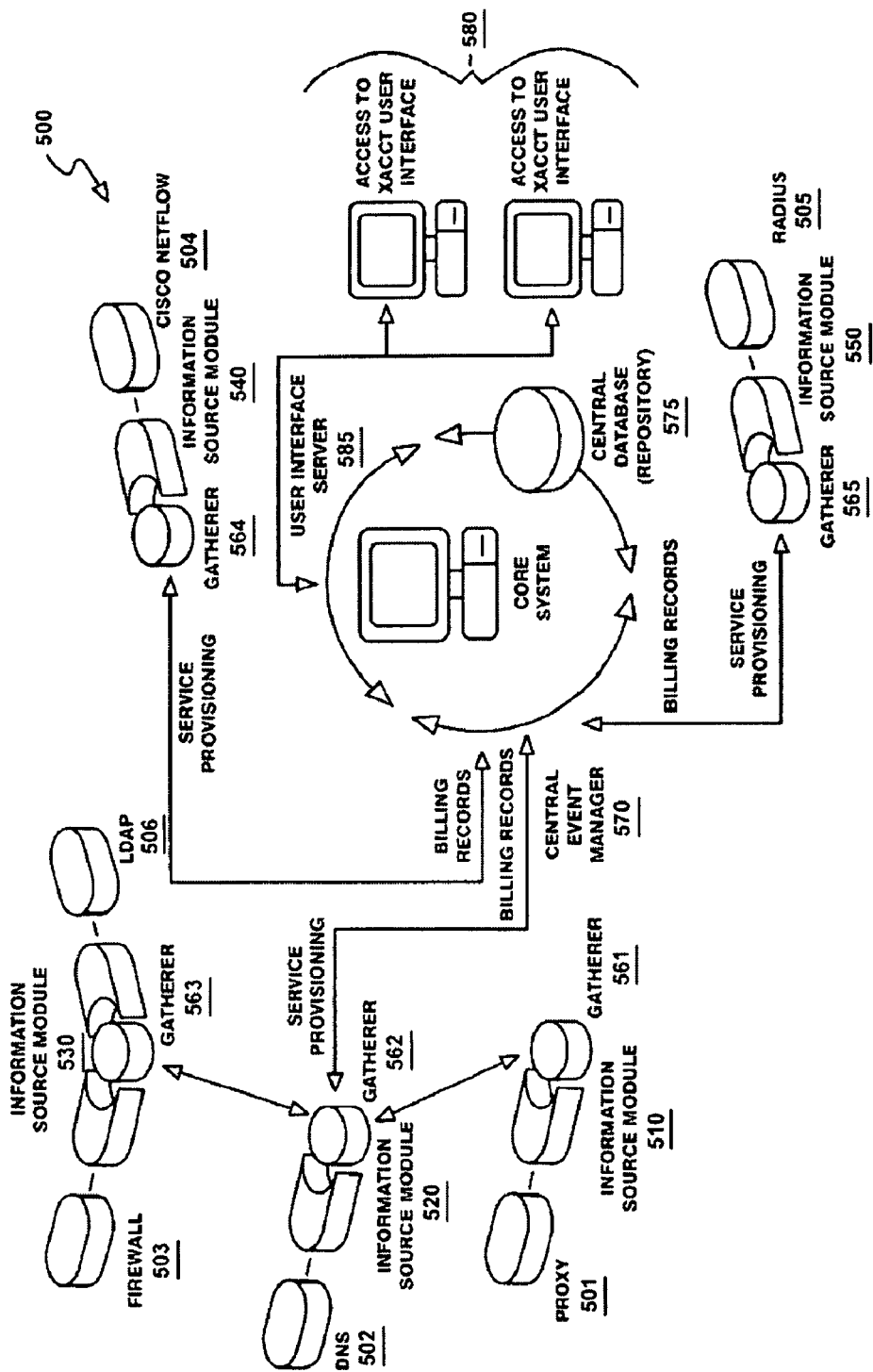
FIGS. 5-8B illustrate an alternate exemplary architecture with which the foregoing techniques may be implemented.

The following describes the system 500 of FIG. 5. The system 500 allows NSPs to account for and bill for IP network communications. The following paragraphs first list the elements of FIG. 5, then describes those elements and then describes how the elements work together. Importantly, the distributed data gathering, filtering and enhancements performed in the system 500 enables load distribution. Granular data can reside in the peripheries of the system 500, close to the information sources. This helps avoids reduce congestion in network bottlenecks but still allows the data to be accessible from a central location. In previous systems, all the network information flows to one location, making it very difficult to keep up with the massive record flows from the network devices and requiring huge databases.

The following lists the elements of FIG. 5. FIG. 5 includes a number of information source modules (ISMs) including an ISM 510, an ISM 520, an ISM 530, an ISM 536, an ISM 540, and an ISM 550. The system also includes a number of network devices, such as a proxy server 501, a DNS 502, a firewall 503, an LDAP 506, a CISCO NetFlow 504, and a RADIUS 505. The system also includes a number of gatherers, such as a gatherer 567, a gatherer 562, a gatherer 563, a gatherer 564, and a gatherer 565. The system of FIG. 5 also includes a central event manager (CEM) 570 and a central database (repository) 575. The system also includes a user interface server 585 and a number terminals or clients 580.

This paragraph describes how the elements of FIG. 5 are coupled. The various network devices represent devices coupled to an IP network such as the Internet. The network devices perform various functions, such as the proxy server 501 providing proxy service for a number of clients. Each network device is coupled to a corresponding ISM. For example, the proxy server 501 is coupled to the ISM 510. The DNS 502 is coupled to the ISM 520. The firewall 503 is coupled to the ISM 530. The ISM 536 is coupled to the LDAP 506. The ISM 540 is coupled to the CISCO NetFlow 504. The ISM 550 is coupled to the RADIUS 505. Each gatherer is associated with at least one ISM. Thus, the gatherer 561 is associated with the ISM 510 and is therefore coupled to that ISM. The gatherer 562 is coupled to the ISM 520. The gatherer 563 is coupled to the ISM 530 and the ISM 536. The gatherer 564 is coupled to the ISM 540. The gatherer 565 is coupled to the ISM 550. The various gatherers are coupled to the CEM 570. The user interface server is coupled to the terminals 580 and the CEM 570.

The following paragraphs describe each of the various elements of FIG. 5.

Network Devices

The network devices represent any devices that could be included in a network. (Throughout the description, a network device, unless specifically noted otherwise, also refers to an application server.) A network device represents a subset of information sources that can be used by the system 500. That is, the network devices are merely representative of the types of sources of information that could be accessed. Other devices such as on-line transaction processing databases can be accessed in other embodiments of the invention. Typically, the network devices keep logging and statistical information about their activity. A network information source can be the log file of a mail server, the logging facility of a firewall, a traffics statistics table available on a router and accessible through SNMP, a database entry accessible through the Internet, an authentication server's query interface, etc. The network devices represent the information sources accessed by the ISMs.

Each type of network device can be accessing using a different method or protocols. Some generate logs while others are accessible via SNMP, others have proprietary APIs or use other protocols.

ISMs

The ISMs act as an interface between the gatherers and the network devices enabling the gatherers to collect data from the network devices. Thus, the ISMs represent modular, abstract interfaces that are designed to be platform-neutral. The information source modules act as interfaces or "translators", sending IP usage data, in real time, from the network devices to the gatherers. Each ISM is designed for a specific type of network data source. (In other embodiments, some ISMs are generic in that they can extract information from multiple network devices). ISMs can be packaged separately, allowing NSPs to customize ISM configurations to meet the specific requirements of their network. For example, in the system of FIG. 5, if the NSP did not have Cisco NetFlow devices, then the ISM 540 would not have to be included.

The ISMs can communicate with its corresponding network device using protocols and formats such as UDP/IP, TCP/IP, SNMP, telnet, file access, ODBC, native API, and others.

In some embodiments, the reliability of system 500 is enhanced through on-the-fly dynamic reconfiguration, allowing the NSP to add or remove modules without disrupting ongoing operations. In these embodiments, the CEM 570 can automatically update the ISMs.

The following ISMs are available in some embodiments of the invention.

Categorizer—Classifies a session to a category according to user-defined Boolean expression.

DNS (e.g. ISM 520)—Resolves host names and IP addresses.

Generic Proxy Server (e.g., ISM 510)—Collects data from access logs in a common log format.

Port/Protocol Resolution—Converts protocol/port information to account names and vice versa.

CheckPoint FireWall-1—Collects data from FireWall-1 accounting log and security log.

Cisco IOS IP Accounting—Collects accounting data from a Cisco router using IOS IP accounting.

Cisco NetFlow Switching—Collects session data from a Cisco router via NetFlow switching.

NETRANET—Collects information from a standard network device.

Netscape Proxy Server—Collects data from a Netscape Proxy Server.

Microsoft Proxy Server—Collects data from a Microsoft ProxyServer.

ISMs can be synchronous, asynchronous or pipe. The data from an asynchronous ISM is dynamic so that the asynchronous ISM reacts to the information and relays it to the associated gatherer without prompting from other information sources in the system 500. If the firewall 503 were a CheckPoint FireWall-1, then the ISM 530 would be an example of an asynchronous ISM. When a network session is initiated, the details are recorded by the FireWall-1 503. The corresponding ISM 530 receives the details and passes them on automatically to the gatherer 563.

Synchronous ISMs provide its information only when accessed by a gatherer. The ISM 520 is an example of a synchronous ISM. The DNS server 502 maintains information matching the IP addresses of host computers to their domain addresses. The ISM 520 accesses the DNS server 502 only when the ISM 520 receives a request from the gather 562. When the DNS server 502 returns a reply, the ISM 520 relays the reply information to the gatherer 562.

Pipe ISMs operate on record flows (batches of records received from information sources). Pipe ISMs process one or more enhancement flows the records as the flows arrive. The pipe ISM may initiate new record flows or may do other things such as generate alerts or provision network elements to provide or stop services. The pipe is implemented as an ISM to keep the internal coherency and logic of the architecture. (Record flows can terminate in a database or in a pipe ISM. The pipe ISM can perform filtering and aggregation, send alarms, or act as a mediation system to provision network elements when some event occurs or some accumulated value is surpassed. Specifically, pipe ISMs can act to enable pre-payment systems to disable certain services such as a voice IP call, when the time limit is surpassed or amount of data is reached.)

The gatherers can include caches and buffers for storing information from the ISMs. The buffers allow the gatherers to compensate for situations where there is a loss of connection with the rest of the system 500. The cache sizes can be remotely configured. The cache minimizes the number of accesses to the Information Source.

ISM queries can be cached and parallelized. Caching of synchronous ISM queries provides for fast responses. Parallelizing queries allows for multiple queries to be processed at the same time.

Gatherers

The gatherers gather the information from the ISMs. In some embodiments, the gatherers are multi-threaded, lightweight, smart agents that run on non-dedicated hosts, as a normal user application on Windows NT or Unix, as a background process, or daemon. What is important though is that the gatherers can be any hardware and/or software that perform the functions of a gatherer.

The gatherers can be installed on the same network segment as the network device such as router and switch or on the application server itself. This placement of a gatherer minimizes the data traffic impact on the network.

The gatherers collect network session data from one or more ISMs. Session data can be sent to another gatherer for enhancement or to the CEM 570 for merging and storing in the central database 570. The gatherers can be deployed on an as needed basis for optimal scalability and flexibility.

The gatherers perform flexible, policy-based data aggregation. Importantly, the various types of ISMs provide different data and in different formats. The gatherers normalize the data by extracting the fields needed by the CEM 570 and filling in any fields that may be missing. Thus, the gatherers act as a distributed filtering and aggregation system. The distributed data filtering and aggregation eliminates capacity bottlenecks improving the scalability and efficiency of the system 500 by reducing the volume of data sent on the network to the CEM 570.

Aggregation can be done by accumulating groups of data record flows, generating a single data record for each group. That single record then includes the aggregated information. This reduces the flow of the data records.

Filtering means discarding any record that belongs to a group of unneeded data records. Data records are unneeded if they are known to be collected elsewhere. A policy framework enables the NSP to configure what to collect where.

Filtering and/or aggregation can be done at any point along a data enhancement (described below) so that aggregation schemes can be based on enhanced data records as they are accumulated. The filtering and/or aggregation points are treated by the system 500 as pipe ISMs which are flow termination and flow starting points (i.e.: like an asynchronous ISM on the starting end and like a database on the terminating end). Data enhancement paths and filtering and/or aggregation schemes can be based on accumulated parameters such as user identification information and a user's contract type.

As noted above, the PISM can be used in the context of filtering and/or aggregation. One or more record flows can terminate at the PISM and can be converted into one or more new record flows. Record flows are grouped based on matching rules that apply to some of the fields in the record flows, while others are accumulated or undergo some other operation such as "maximum" "average". Once the groups of accumulated records have reached some threshold, new accumulated records are output. This can be used for example in order to achieve a business-hybrid filtering and aggregation data reduction by imposing the business rules or the usage-based products that are offered to the customer, onto the record flows as they are collected in real-time. This is done instead of previous system where the information is stored in a database and then database operations are performed in order to create bills or reports. The filtering and aggregation reduces the amount of data that is stored in the central database 575 while not jeopardizing the granularity of data that is necessary in order to create creative usage-based products.

Typically, data collected from a single source does not contain all the information needed for billing and accounting, such as user name and organization. In such cases, the data is enhanced. By combining IP session data from multiple sources, such as authentication servers, DHCP and Domain Name servers, the gatherers create meaningful session records tailored to the NSP's specific requirements. In the example of FIG. 5, the gatherer 561 can provide information to the gatherer 562 so that the source IP address for an Internet session from the proxy server 501 can be combined with the domain address from the DNS server 502.

The enhancement procedure can be triggered by an asynchronous ISM. The information from the asynchronous ISM is associated with field enhancements in the central database 575. A field enhancement defines how a field in the central database is filled from the source data obtained from the asynchronous ISM. Through the field enhancements, the missing parameters are added to a record using the data collected from one or more synchronous ISMs. Enhancements are described in detail below.

The gatherers can include caches and buffers for storing information from the ISMs. The buffers allow the gatherers to compensate for situations where there is a loss of connection with the rest of the system 500. The caches can reduce the number of accesses to an information source. The buffer and/or cache sizes can be remotely configured.

Central Event Manager (CEM)

The Central Event Manager (CEM) 570 acts as the central nervous system of the system 500, providing centralized, efficient management and controls of the gatherers and the ISMs. The CEM 570 can perform one or more of the following tasks.

Coordinates, controls, and manages the data collection process. The CEM 570 coordinates the operation of the gatherers and manages the flow of data through the system 500 through the collection scheme defined in the system configuration. The latter includes the configuration of the gatherers, the ISMs, the network devices, the fields in the central database 575 (described below), and the enhancement procedures. Based on the collection scheme the CEM 570 determines the system 500's computation flow (the set of operations the system 500 must perform to obtain the desired information). The CEM 570 then controls all the gatherers, instructing them to perform, in a particular sequence, the operations defined in the computation flow. The CEM 570 receives the records collected by the gatherers and stores them in the central database 575. NSPs can configure the CEM 570 to merge duplicate records before storing them in the central database 575. Record merging is described below.

Performs clean-up and aging procedures in the database 575. The system 500 collects and stores large amounts of session information every day. The CEM 570 removes old data to free space for new data periodically. The NSP defines the expiration period for the removal of old records. The CEM 570 is responsible for coordinating the removal of records from the central database 575. The CEM 570 places a time stamp on every record when the record enters the central database 575 and deletes the record after the time period the NSP has defined elapses.

Provides centralized system-wide upgrade, licensing, and data security. The NSP can perform version upgrades of the system 500 at the CEM 570. The gatherers can be automatically upgraded once a new version is installed on the host computer of the CEM 570. ISMs are also installed via the CEM 570 and exported to the gatherers. The CEM 570 maintains a list of licenses installed in the system and verifies periodically if the system is properly licensed. This feature lets the NSP centrally install and uninstall licenses. It also prevents unlicensed use of the system 500 and any of its components.

Monitors the state of the gatherers and ISMs. The gatherers periodically communicate with the CEM 570. The CEM 570 continuously monitors the state of each gatherer and network devices in the system 500. The CEM 570 can be fault-tolerant, that is, it can recover from any system crash. It coordinates the recovery of the system 500 to its previous state.

In some embodiments, a key directory server is associated with the CEM 570. To transfer less data between the elements of the system 500, it is desirable that each piece of data to carry little descriptive data. For example, if IP address data is transferred between a gatherer and the CEM 570, a description of the IP address data is typically included. In some embodiments, data name/key, type, and length descriptions are included with the actual IP address data. In other embodiments, there the key directory server reduces the amount of descriptive information being sent. Every key in the directory server has a type and a length. Fields can be identified as variable length. Therefore, data type information need not be transmitted between elements in the system 500 if the elements use a common reference key stored in the directory server. Returning to the IP address data, by using the key directory server, elements need only send two bytes for the key id and four bytes for the actual address. Most of the data being sent in the system is relatively short in length. Therefore, the directory server helps reduce the amount of information being sent between the elements in the system 500.

Keys can be added to the directory server. The directory server can therefore support expansion of the kinds of fields being sent by allowing system elements to update their locally stored key ids. For example, after a recipient receives a record with an "unknown" key, it contacts the directory server to get the key definition.

Central Database

The central database 575 is the optional central repository of the information collected by the system 500. The central database 575 is but one example of a sink for the data generated in the system 500. Other embodiments include other configurations. The central database 575 stores and maintains the data collected by the gatherers, as well as the information on the configuration of the system 500. Thus, in configuring the system 500, the NSP defines what data will be stored in each field in the central database 575 and how that data is collected from the ISMs.

The information on network sessions is stored in the database in the form of a table. Each field in the table represents a network session parameter. Each record describes a network session. The system 500 has a set of pre-defined fields that are configured by the CEM 570 on installation. The NSP can modify the central database 575 structure by adding, deleting, or modifying fields. The NSP access the data in the central database 575 by naming queries and reports. The old data is removed from the central database 575 to free space for new data periodically. You can specify the time interval for which records are stored in the central database 575. The structure of the central database 575 with some of the predefined fields is illustrated in the following figure.

As each IP session may generate multiple transaction records, during the merge process the CEM 570 identifies and discards duplications, enhancing the efficiency of the data repository. Generally, data records are passed through the merger program, in the CEM 570, into the central database 575. However, the data records are also cached so that if matching records appear at some point, the already stored records can be replaced or enhanced with the new records. The database tables that contain the record flows can be indexed, enhancing the efficiency of the data repository. A merge is achieved by matching some of the fields in a data record and then merging the matching records from at least two record flows, transforming them into one record before updating the central database 575. In some embodiments, adaptive tolerance is used to match records. Adaptive tolerance allows for a variation in the values of fields that are compared (e.g., the time field value may be allowed to differ by some amount, but still be considered a match). The adaptive aspect of the matching can include learning the appropriate period to allow for the tolerance. The reason that the records that do not match any previous records are sent through into the central database 575, in addition to being cached for later matching, is to avoid loss of data in case of system failure.

The system 500 supports a non-proprietary database format enabling the central database 575 to run on any of a number of commercially available databases (e.g., MS-SQL Server, Oracle Server, D132, etc.).

User Interface Server and Clients

The User Interface Server (UIS) 585 allows multiple clients (e.g. terminals 580) to access the system 500 through, the Microsoft Internet Explorer with Java™ Plug-in or Netscape Navigator with Java™ Plug-in. Other embodiments can use other applications to access the system 500. The main function of the UIS 585 is to provide remote and local platform independent control for the system 500. The UIS 585 can provide these functions through windows that correspond to the various components of the system 500. Access to the system 500 can be password protected, allowing only authorized users to log in to the system and protecting sensitive information.

Figure 6:
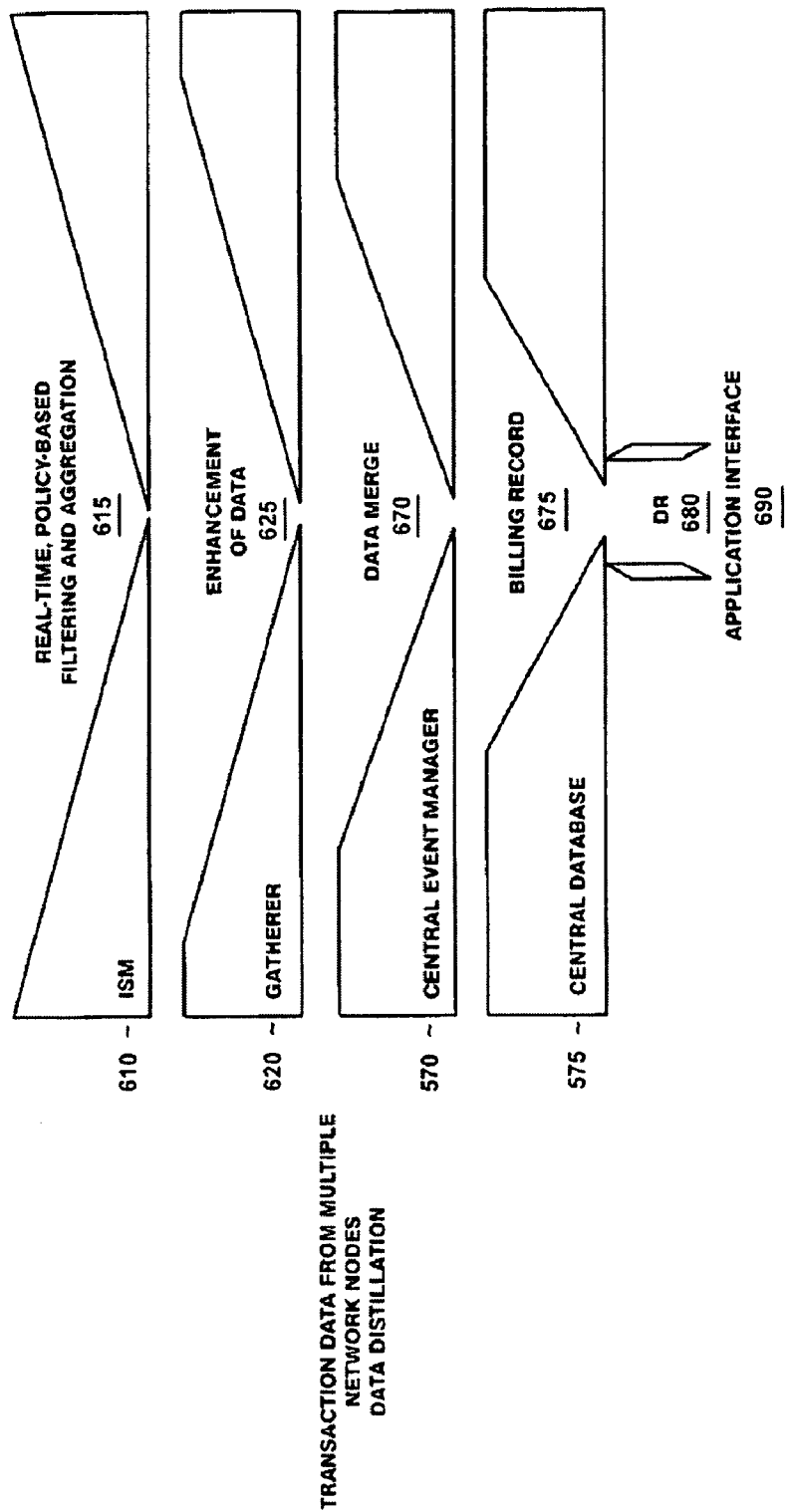

The NSP can perform one or more of the following main tasks through the UIS 585:
  Configure the system 500.
  Create and run queries and reports on network activity and resource consumption.
  Register and license the system 500.
  Data Distillation FIG. 6 illustrates the data distillation process performed by the system of FIG. 7. The data distillation aggregates and correlates information from many different network devices to compile data useful in billing and network accounting.

First, the ISMs 610 gather data from their corresponding network device. Note that for some ISMs (e.g. pipe IS7Ms), real-time, policy-based filtering and aggregation 615 can also be done. This data is then fed to the gatherers 620. The gatherers 620 perform data enhancement to complete the data from the ISMs 610. The results are provided to the CEM 570. The CEM 570 performs data merges 670 to remove redundant data. The merged data is then optionally stored in the central database 575 as a billing record 675 or is sent directly to an external system. The billing record information can be accessed from external applications, through the application interface 690, via a data record 680. Filtering and/aggregation and/or data enhancements can be done at any stage in the system 500.

Data Enhancement

As mentioned above, the gatherers 620 provide data enhancement features to complete information received from the ISMs 610. The following describes some example data enhancement techniques used in some embodiments of the invention.

Figure 7:
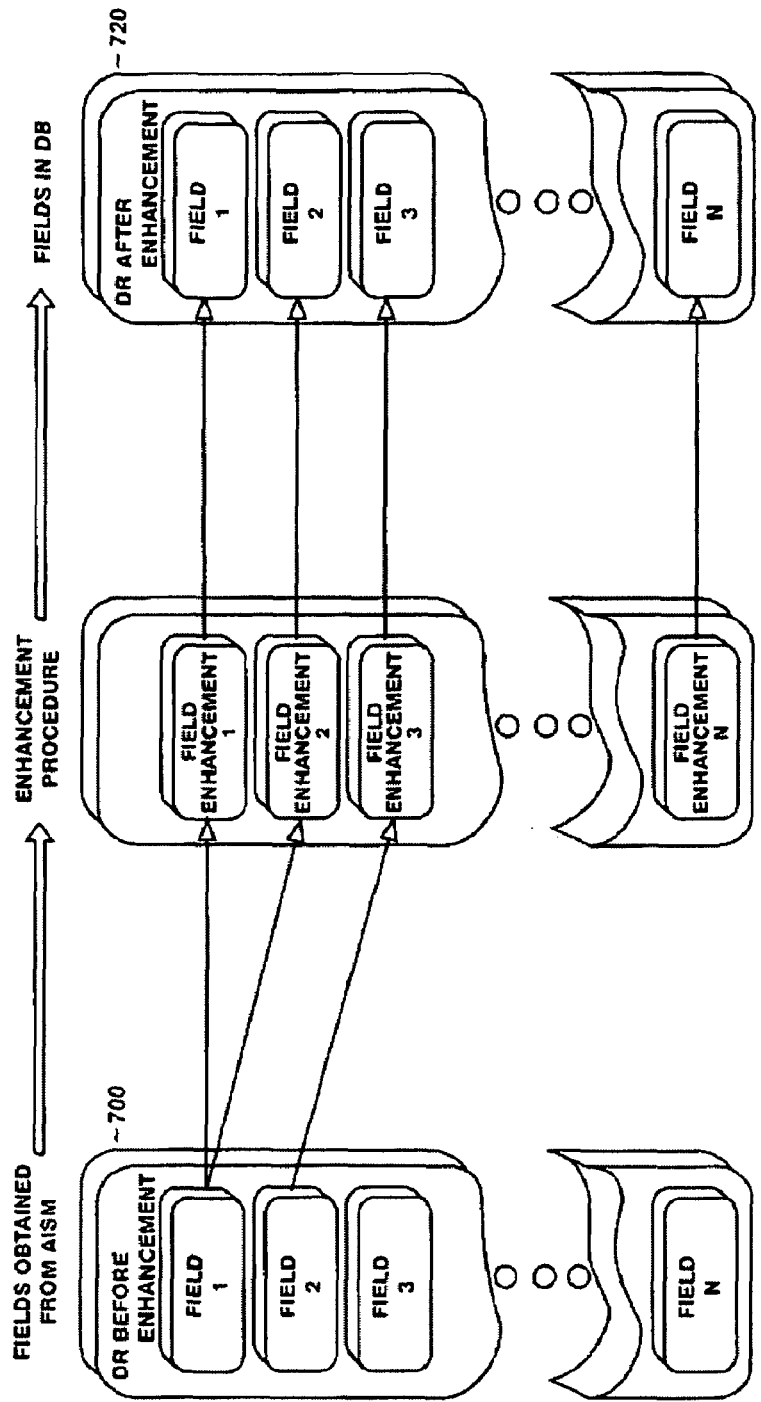

FIG. 7 illustrates an example of data enhancement. Data enhancement comprises a number of field enhancements. A field enhancement specifies how the data obtained from the trigger of the enhancement procedure is processed before it is placed in a single field in the central database 575. The data can be placed in the field directly, or new information may be added to the record by applying a Synchronous ISM function. (In the example below, the function resolves the IP address to a host FQDN"). Field enhancements may involve one or multiple steps. There is no limit to the number of steps in a Field Enhancement. The data record starts with fields obtained from an asynchronous ISM 700. The fields in the DR 700 are then enhanced using the field enhancements. The enhanced fields result in the DR 720.

A visual representation of an enhancement can be presented to the NSP. The enhancement may include an itinerary of ISMs starting off with an AISM, passing through PISMs, and terminating in the CEM 570. Using this view of the system 500, the NSP need not be shown the actual flow of data since the flow may be optimized later in order to achieve better performance. This is more of a graphical logical view of how the enhancement is achieved in steps. (PISMs can terminate more than one flow and initiate more than one flow.)

A visual representation of a field enhancement shows the per-field flow of data correlation. This process ends in the CEM 570 or in a PISM. The NSP supplies information telling the system 500 how to reach each of the terminating fields (in the CEM 570 or the PISM) starting off from the initiating fields (PISM or AISM). Each step of enhancement defines cross correlation with some SISM function.

Figure 8A:
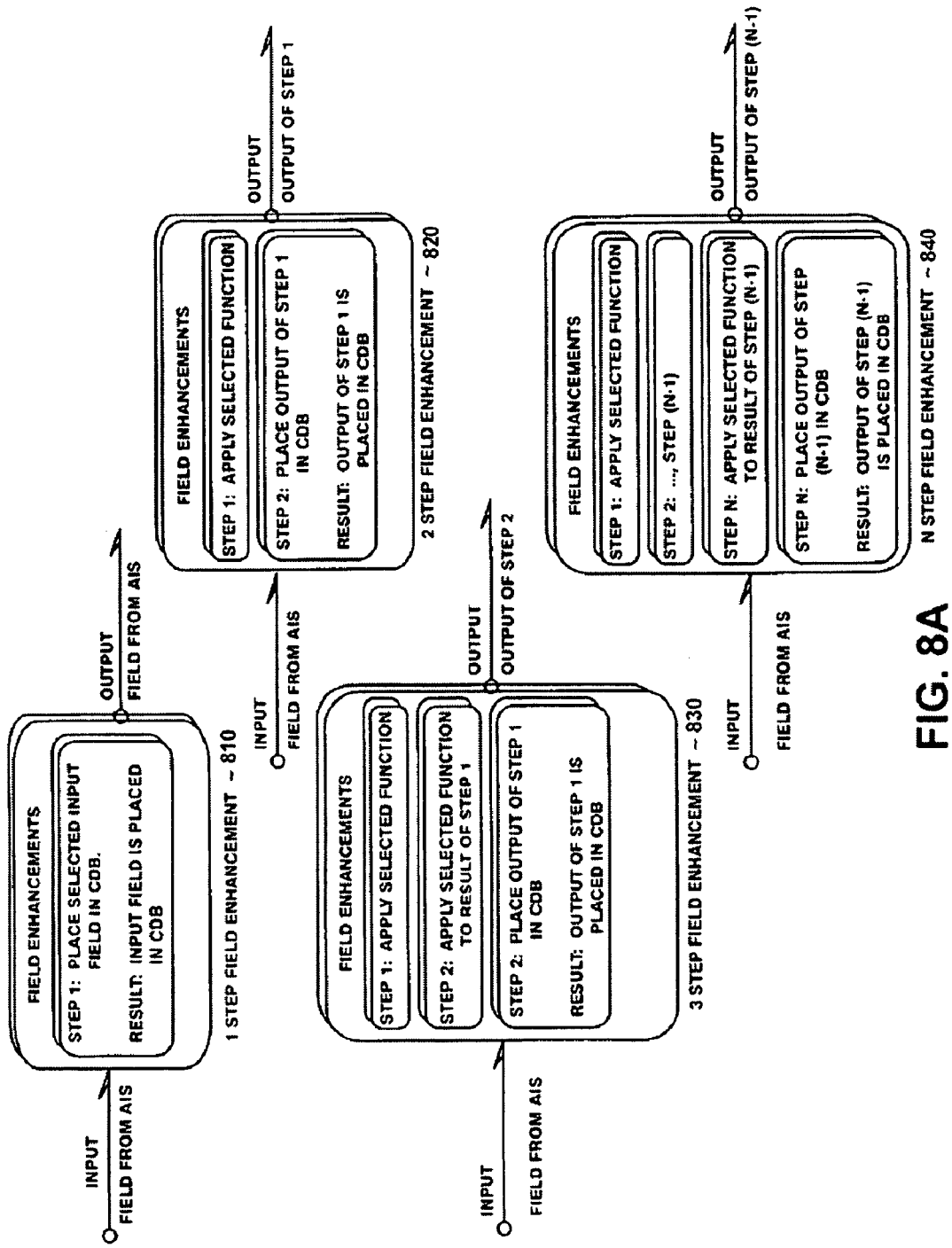

FIG. 8A illustrates various field enhancements (810 through 840). A field enhancement includes applying zero or more functions to a field before storing the field in a specified field in the central database 575.

One-step Field Enhancement 810. The initial source data from the asynchronous ISM is placed directly in a field in the central database 575. Example: the field enhancement for the Source IP field.

Two-step Field Enhancement 820. The initial source data from the asynchronous ISM is used to obtain new additional data from a synchronous network device and the new data is placed in a field in the central database 575. Example: the field enhancement for the Source Host field.

Three-step Enhancement 830. The initial source data from the asynchronous ISM is used to obtain additional data from a synchronous ISM. The result is used to obtain more data from another ISM and the result is placed in a field in the central database 575.

The following illustrates an example data enhancement. Suppose the data obtained from a proxy server 501 contains the source IP address of a given session, such as 199.203.132.2, but not the complete domain address of the host computer (its Fully Qualified Domain Name), such as www.xacct.com. The name of the host can be obtained by another network device—the Domain Name System (DNS 502) server. The DNS server 502 contains information that matches IP addresses of host computers to their Fully Qualified Domain Names (FQDNs). Through an enhancement procedure the information collected from the proxy server 501 can be supplemented by the information from the DNS 502. Therefore, the name of the host is added to the data (the data record) collected from the proxy server 501. The process of adding new data to the data record from different network devices can be repeated several times until all required data is collected and the data record is placed in the central database 575.

Figure 8B:
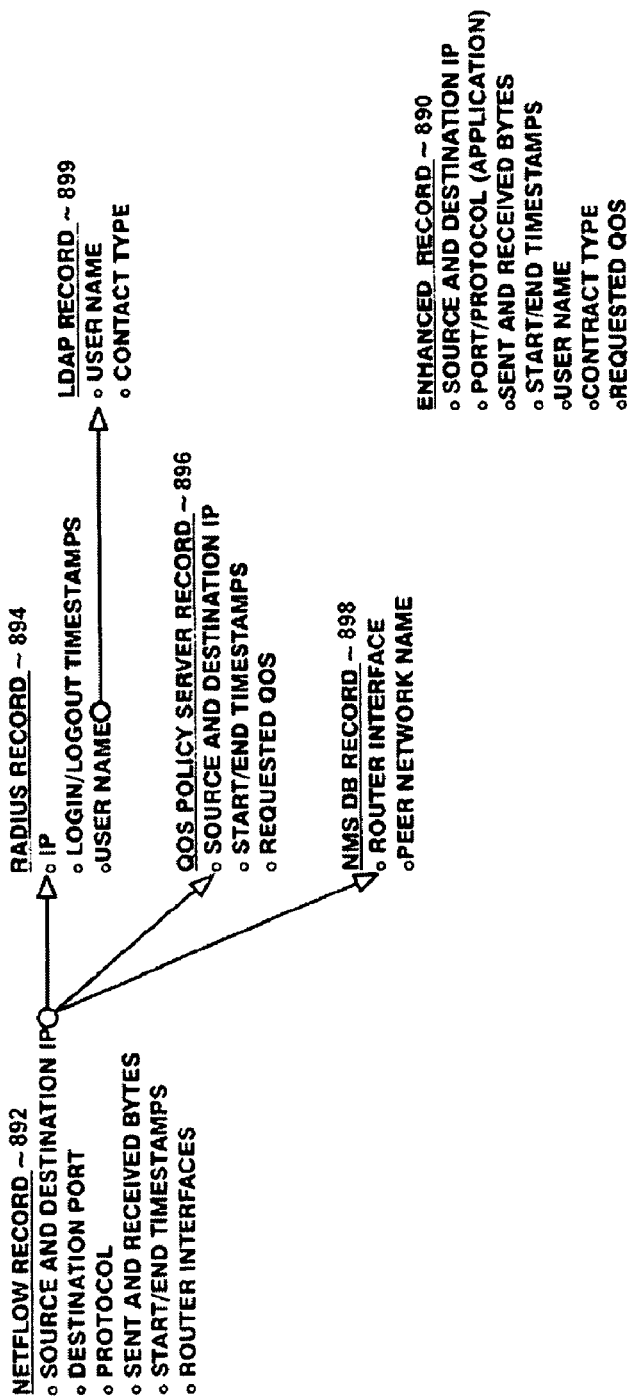

FIG. 8B illustrates another example data enhancement where an enhanced record 890 is created from an initial netflow record 892. Fields in the enhanced record 890 are enhanced from the radius record 894, the QoS policy server record 896, the NMS D13 record 898, and the LDAP record 899.

Defining Enhancement Procedures

The following describes the process for defining enhancement procedures in some embodiments of the system. Typically defining an enhancement procedure for the system 500 includes (1) defining enhancement procedures for each asynchronous ISM and (2) configuring field enhancements for all fields in the central database 575 for which the NSP wants to collect data originating from an asynchronous ISM that triggers the corresponding enhancement procedure.

An enhancement procedure can be defined as follows.
1. Access the CEM 570 using the UIS 580.
2. Select the enhancement procedures list using the UIS 780.
3. Define the name of the new enhancement procedure.
4. Select a trigger for the new enhancement procedure. The trigger can correspond to any asynchronous ISM in the system 500. Alternatively, the trigger can correspond to any asynchronous ISM in the system 500 that has not already been assigned to an enhancement procedure.
5. Optionally, a description for the enhancement procedure can be provided.
6. The new enhancement procedure can then be automatically populated with the existing fields in the central database 575. Optionally, the NSP can define the fields (which could then be propagated to the central database 575). Alternatively, based upon the type of asynchronous ISM, a preset set of fields could be proposed to the NSP for editing. What is important is that the NSP can define field procedures to enhance the data being put into the data records of the central database 575.
7. The NSP can then define the field enhancements for every field in the new enhancement procedure for which the NSP wants to collect data from the ISM that is the trigger of the new enhancement procedure.

Defining Field Enhancements

Defining a field enhancement involves specifying the set of rules used to fill a database field from the information obtained from the trigger of the enhancement procedure. The NSP defines field enhancements for each field in which NSP wants to collect data from the trigger. If no field enhancements are defined, no data from the trigger will be collected in the fields. For example, suppose the firewall asynchronous ISM 530 that triggers an enhancement procedure. Suppose the central database 575 has the following fields: source IP, source host, destination IP, destination host, user name, total bytes, service, date/time, and URL lithe NSP wants to collect session data for each field except the URL from the firewall 530, which triggers the enhancement procedure, the NSP defines a field enhancement for each field with the exception of the URL.

In some embodiments, the field enhancements are part of the enhancement procedure and the NSP can only define and modify them when the enhancement procedure is not enabled.

The field enhancements can be defined in a field enhancement configuration dialog box. The field enhancement configuration dialog box can have two panes. The first displays the name of the enhancement procedure, the name of its trigger, and the name and data type of the field for which the NSP is defining the field enhancement. The second is dynamic and interactive. Its content changes depending on the NSP's input. When first displayed, it has two toggle buttons, End and Continue, and a list next to them. The content of the list depends on the button depressed.

When End is depressed, the list contains all output fields whose data type matches the data type of the field for which the NSP is defining the field enhancement. For example, if the field's data type is IP Address, the list contains all fields that are of the same type, such as source IP and destination IP that the AISM supplies. The fields in the list can come from two sources: (1) the source data which the gatherer receives from the trigger and (2) the result obtained by applying a synchronous ISM function as a preceding step in the field enhancement. The following notation is used for the fields:

OutFieldName for the output of a field origination from the trigger

SISName. FunctionName (InputArgument). OutputField for the output of a field that is the result of applying a function SISName . . . OutputField for the output of a field that is the result of applying a function as the final step of a field enhancement. The following examples are presented.

Source IP is the field provided by the trigger of the enhancement procedure that contains the IP address of the source host.

DNS . . . . Host Name and DNS.Name(Source IP). Host name are the names of a field originating from the resolved function Name of a network device called DNS that resolves the IP address to a domain address. The input argument of the function is the field provided by the trigger of the enhancement procedure, called source IP. It contains the IP address of the source host. The function returns the output field called Host Name that contains the domain address of the source host. The notation DNS . . . . Host Name is used when the field is the result of applying the function as the final step of a field enhancement. The notation is DNS.Name(Source IP). Host Name is used when the field is used as the input to another function.

In the user interface, if End is unavailable, none of the output fields matches the data type of the field.

When Continue is depressed, the list contains all applicable functions of the available synchronous network device configured in the system 500. If the preceding output does not match the input to a function, it cannot be applied and does not appear on the list.

The following notation is used for the functions.

SISName.FunctionName(InputFieldName:InputFieldDataType)(OutputFieldName.—OutputFieldDataType)

When the function has multiple input and/or output arguments, the notation reflects this. The arguments are separated by commas.

The following example shows a field enhancement.

DNS. Address(Host Name:String)→(IP Address:IP Address)

Where DNS is the name of the synchronous ISM (or network device) as it appears in the system configuration.

Address is the name of the function.

(Host Name:String) is the input to the function—host FQDN of data typeString (IP Address:IP Address) is the output—IP address of data type IP Address The NSP can define the field enhancement by choosing items from the list. The list contains the option <none> when the End button is depressed. Choosing this option has the same effect as not defining a field enhancement: no data from the trigger will be stored in the field in the central database 575.

Additional Embodiments

The following describes additional embodiments of the invention.

In some embodiments, the user interface used by an NSP to configure the system 500 can be presented as a graphical representation of the data enhancement process. Every step in the enhancement can be shown as a block joined to another block (or icon or some graphical representation). The properties of a block define the operations within the block. In some embodiments, the entire data enhancement process from network devices to the central database 575 can be shown by linked graphics where the properties of a graphic are the properties of the enhancement at that stage.

In some embodiments, multiple CEMs 570 and/or central databases 575 can be used as data sources (back ends) for datamart or other databases or applications (e.g., customer care and billing systems).

In some embodiments, the types of databases used are not necessarily relational. Object databases or other databases can be used.

In some embodiments, other platforms are used. Although the above description of the system 500 has been IP network focused with Unix or Windows NT systems supporting the elements, other networks (non-IP networks) and computer platforms can be used. What is important is that some sort of processing and storing capability is available at the gatherers, the CEMs, the databases, and the user interface servers.

In some embodiments, the gatherers and other elements of the system 500, can be remotely configured, while in other embodiments, some of the elements need to be configured directly. For example, a gatherer may not be remotely configurable, in which case, the NSP must interface directly with the computer running the gatherer.

In other embodiments, the general ideas described herein can be applied to other distributed data enhancement problems. For example, some embodiments of the invention could be used to perform data source extraction and data preparation for data warehousing applications. The gatherers would interface with ISMs that are designed to extract data from databases (or other data sources). The gatherers would perform filtering and aggregation depending upon the needs of the data mart (in such an embodiment, the central database and CEM could be replaced with/used with a data mart). The data enhancement.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring a digital asset communicated over a network, comprising:

passively inspecting packets communicated between a first party and a plurality of other parties, wherein the packets collectively include at least a portion of data associated with a digital asset;

identifying at least one aspect associated with the first party based on the inspected packets;

identifying at least one aspect associated with the digital asset based on the inspected packets; and identifying at least one aspect associated with at least one of the plurality of other parties based on the inspected packets;

wherein the at least one aspect associated with the first party includes a time when the packets were communicated.

2. The method as recited in claim 1, wherein the at least one aspect associated with the first party identifies an identity of the first party.

3. The method as recited in claim 2, wherein the at least one aspect associated with the first party includes an Internet Protocol (IP) address.

4. The method as recited in claim 1, wherein the at least one aspect associated with the digital asset identifies the digital asset.

5. The method as recited in claim 4, wherein the at least one aspect associated with the digital asset includes a file name.

6. The method as recited in claim 1, wherein the packets are communicated via a peer-to-peer protocol.

7. The method as recited in claim 1, wherein the packets are communicated via a client-server protocol.

8. The method as recited in claim 1, and further comprising determining whether the digital asset is compressed, and decompressing the digital asset prior to identifying the at least one aspect associated with the first party and the at least one aspect associated with the digital asset.

9. The method as recited in claim 1, and further comprising determining whether the digital asset is encrypted, and decrypting the digital asset prior to identifying the at least one aspect associated with the first party and the at least one aspect associated with the digital asset.

10. The method as recited in claim 1, wherein the packets communicated between the first party and the plurality of other parties are inspected at two or more separate nodes on the network, and the at least one aspect associated with the first party and the at least one aspect associated with the digital asset are identified based on the inspection of the packets at the two or more separate nodes on the network.

11. The method as recited in claim 1, wherein the at least one aspect associated with the first party and the at least one aspect associated with the digital asset are identified for detecting a copyright infringement associated with the communication of the digital asset associated with the packets.

12. The method as recited in claim 1, wherein the at least one aspect associated with the first party and the at least one aspect associated with the digital asset are identified for generating revenue for the communication of the digital asset associated with the packets.

13. The method as recited in claim 1, wherein the at least one aspect associated with the first party and the at least one aspect associated with the digital asset are identified for fraud analysis.

14. The method as recited in claim 1, wherein the at least one aspect associated with the first party and the at least one aspect associated with the digital asset are identified for service level management.

15. The method as recited in claim 1, wherein the portion of data associated with the digital asset is filtered to reduce the amount of processing involved.

16. A computer program product for monitoring a digital asset communicated over a network, comprising:
- computer code for passively inspecting packets communicated between a first party and a plurality of other parties, wherein the packets collectively include at least a portion of data associated with a digital asset;
- computer code for identifying at least one aspect associated with the first party based on the inspected packets;
- computer code for identifying at least one aspect associated with the digital asset based on the inspected packets; and
- computer code for identifying at least one aspect associated with at least one of the plurality of other parties based on the inspected packets;
- wherein the at least one aspect associated with the first party includes a time when the packets were communicated.

17. A system for monitoring a digital asset communicated over a network, comprising:
- a module adapted for passively inspecting packets communicated between a first party and a plurality of other parties, wherein the packets collectively include at least a portion of data associated with a digital asset;
- wherein the system is operable such that at least one aspect associated with the first party and at least one aspect associated with the digital asset are identified based on the inspected packets;
- wherein the system is operable such that at least one aspect associated with at least one of the plurality of other parties is identified based on the inspected packets;
- wherein the at least one aspect associated with the first party includes a time when the packets were communicated.

* * * * *